(12) United States Patent
Fried et al.

(10) Patent No.: US 6,720,087 B2
(45) Date of Patent: Apr. 13, 2004

(54) TEMPERATURE STABLE PROTECTIVE COATING OVER A METALLIC SUBSTRATE SURFACE

(75) Inventors: Reinhard Fried, Nussbaumen (CH); Alkan Goecmen, Baden-Daettwil (CH); Abdus S. Khan, Ennetbaden (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/193,278

(22) Filed: Jul. 12, 2002

(65) Prior Publication Data

US 2004/0009365 A1 Jan. 15, 2004

(30) Foreign Application Priority Data

Jul. 13, 2001 (CH) ..................... 2001 1304/01

(51) Int. Cl.⁷ .............................. B32B 15/04; F03B 3/12
(52) U.S. Cl. ..................... 428/614; 428/609; 428/615; 428/632; 428/679; 428/680; 416/241 R; 416/229 R; 415/200; 415/215.1; 415/174.4
(58) Field of Search ................... 428/609, 615, 428/632, 633, 937, 172, 469, 621, 614, 679, 680; 416/241 B, 241 R, 95, 224, 229 R; 415/200, 170.1, 174.1, 174.4, 215.1

(56) References Cited

U.S. PATENT DOCUMENTS

| | | | |
|---|---|---|---|
| 3,877,961 A | 4/1975 | Tank et al. | |
| 4,273,824 A | 6/1981 | McComas et al. | |
| 4,289,447 A | * 9/1981 | Sterman et al. | |
| 4,405,284 A | 9/1983 | Albrecht et al. | |
| 4,639,388 A | 1/1987 | Ainsworth et al. | |
| 5,080,934 A | 1/1992 | Naik et al. | |
| 5,894,053 A | 4/1999 | Fried | |
| 5,955,182 A | 9/1999 | Yasuda et al. | |
| 6,264,766 B1 | * 7/2001 | Ritter et al. | |
| 6,277,500 B1 | 8/2001 | Konter et al. | |
| 6,280,857 B1 | 8/2001 | Sommer et al. | |
| 6,375,425 B1 | * 4/2002 | Lee et al. | |
| 6,588,103 B2 | 7/2003 | Fernihough et al. | |
| 2001/0004436 A1 | 6/2001 | Chasripoor et al. | |

FOREIGN PATENT DOCUMENTS

| | | |
|---|---|---|
| DE | 3015867 A1 | 11/1980 |
| EP | 0965730 A2 | 12/1999 |
| EP | 1001055 A1 | 5/2000 |

* cited by examiner

Primary Examiner—Jennifer McNeil
(74) Attorney, Agent, or Firm—Adam J. Cermak

(57) ABSTRACT

The invention describes a temperature-stable protective coating over a metallic substrate surface (1), which coating includes at least one layer of material (4) consisting of MCrAlY, where M represents at least one of the elements selected from the group of materials consisting of Fe, Co and Ni. The invention also describes a production process for this coating. The invention is distinguished by the fact that a multiplicity of local elevations, known as rivets (3), are provided distributed directly over the area of the substrate surface (1) or distributed indirectly over the area of the substrate surface, separated from the substrate surface (1) by means of at least one interlayer (2), which rivets are fixedly joined to the substrate surface (1) or the interlayer (2), that at least one layer of material (4) consisting of MCrAlY is deposited on the substrate surface (1) or interlayer (2) in such a manner that the layer of material (4) consisting of MCrAlY completely surrounds the rivets (3), completely fills regions which lie between adjacent rivets (3) and projects above the rivets (3).

17 Claims, 3 Drawing Sheets

TEMPERATURE STABLE PROTECTIVE COATING OVER A METALLIC SUBSTRATE SURFACE

TECHNICAL FIELD

Figure 1:
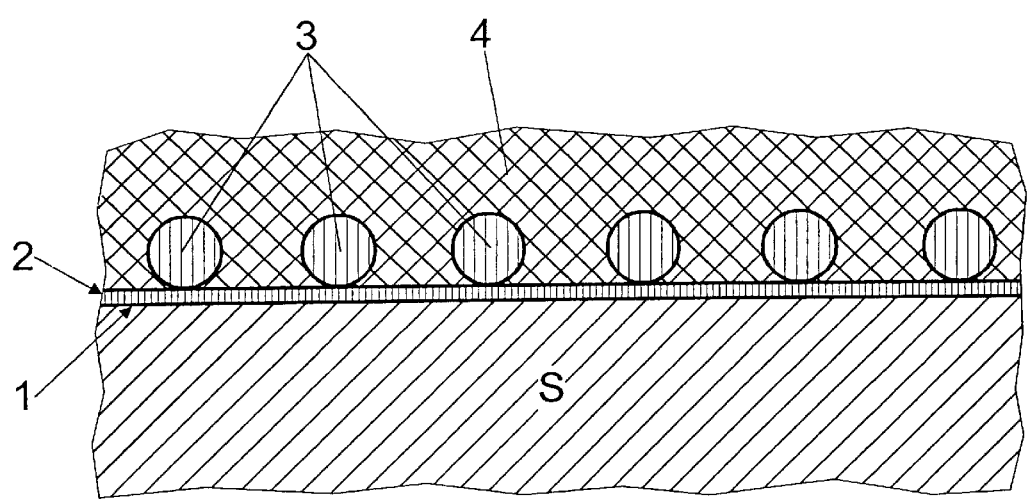

The invention relates to a temperature-stable protective coating over a metallic substrate surface, which coating includes at least one layer of material consisting of MCrAlY, where M represents at least one of the elements selected from the group of materials consisting of Fe, Co and Ni. The invention also describes a process for producing a protective coating of this type.

PRIOR ART

Temperature-stable protective coatings of the generic type described in the introduction are preferably used in the field of gas turbine engineering, for example in combustion chambers, on blade profiled sections and in the form of outer air seals. In particular, the design of outer air seals has been the subject of considerable attention in the prior art, and there is a constant search for new, effective embodiments of such sealing systems. In an axial gas turbine engine, rings of rotor blades extend radially outward beyond the flow path of the working gas both in the compression section and in the turbine section of the gas turbine installation, on the rotor arrangement. An outer air seal, which is secured to the stator arrangement, surrounds the tips of the rotor blades of each rotor blade ring, in order to reduce the leakage of working gases over the tips of the rotor blades. Each outer air seal is usually composed of a plurality of sealing segments which are arranged around the engine at the end. The surfaces of the segments which lie opposite the tips are in each case usually produced from a wearable material, which allows starting conditions which have tight tolerances without destructive contact with the rotor blade tips during transition states. Despite the existence of materials and designs for outer air seals, the search for better wearable material designs and materials which are sufficiently durable in aggressive environments, in particular within the turbine stages of gas turbines, in which sealing materials are exposed to local temperatures of around 1200° C., goes on, since the choice of materials and structures which are sufficiently durable is very limited. Materials which are frequently used for these purposes are ceramic materials which, however, compared to the metallic surfaces of, for example, a gas turbine rotor blade, have different thermal expansion properties, with the result that a secure join between the ceramic, abradable materials and a metallic surface, for example at the rotor blade tip, causes technical problems.

Taking account of the problem of the different thermal expansion properties, a range of different joining techniques between temperature-stable ceramic materials are known.

For example, in a manner which is known per se, what are known as conventional honeycomb structures, which comprise correspondingly deformed thin metal sheets, for example of Hasteloy-X or PM2000, are joined to the outer tip of a gas turbine blade or vane by welding or soldering and are filled with suitable temperature-stable material, preferably of the NiAl or NiCrAl type. Honeycomb structures of this type, which are abraded during a stripping action between the gas turbine blade or vane and the stationary housing element and in this way help to achieve a minimum clearance between rotating and stationary components, however, have the drawback of being insufficiently thermally stable; in particular, the welded or soldered joints which are required do not form sufficiently durable joints, on account of the high operating temperatures which prevail, or alternatively these thin metal sheets may themselves not be sufficiently resistant to oxidation.

Furthermore, for many years it has been attempted to join temperature-stable ceramic materials to corresponding metal surfaces by thermal flame spraying. For example, DE 30 15 867 C2, to which, it should be noted, reference is made with regard to the extensive discussion of the prior art which it includes, describes a process for producing an object, preferably a gas turbine blade or vane, from a metal-ceramic composite. In this case, the metal surface which is to be coated with the temperature-stable ceramic has a metallic, porous cushion which, for further joining, is impregnated, i.e. covered or coated, with a material of the MCrAlY type. Then, the temperature-stable ceramic material is applied to the porous metallic cushion which has been prepared in this manner by means of plasma spray coating.

EP 0 965 730 has described a component which is provided with a ceramic coating and delimits the sealing gap with respect to a tip of a gas turbine blade or vane. In this case, the component, which has been coated with a temperature-stable ceramic layer, has a sandwich layer structure, of which the interlayer, which is directly joined to the component, consists of MCrAlY material.

However, all the known process technologies used to produce abradable, temperature-stable layers or layer structures which are intended to reduce the size of the sealing gap between the stationary and rotating components of a gas turbine installation are subject to the drawback that the layer coatings which can be produced thereby all have a bonding strength and resistance to oxidation which are in need of considerable improvement, especially in view of the extremely high temperatures of up to 1200° C. to which they are exposed. Also, the ceramic materials which are in use have only a low abradability, and consequently high mechanical forces are generated between the stationary and rotating gas turbine components during the running-in process, imposing considerable mechanical loads on the entire arrangement.

SUMMARY OF THE INVENTION

Therefore, the object of the invention is to avoid the drawbacks which have been listed above in connection with the prior art and in particular to provide an abradable layer between stationary and rotating components of a gas turbine installation which on the one hand has a high thermal stability and resistance to oxidation and, moreover, forms a permanent and reliable joint with the metallic substrate surface of the respective components. Finally, the layer is to have improved abrasion properties, so that running in a gas turbine installation does not give rise to any abrasion forces between the stationary and rotating components which would impose an excessive load on the installation. In addition to the temperature-stable protective coating which is to be applied to the metallic substrate surface of a gas turbine component, the invention also aims to describe a corresponding process for producing just such a layer.

Unlike in the process technologies which have hitherto been known for the application of ceramic layers as abradable layers, according to the invention it is proposed for MCrAlY material e.g., SV20 or SV34, which is deposited as a thick layer on a metallic substrate surface to be used directly as abradable layer material. To ensure that the MCrAlY layer forms a permanently fixed, intimate joint with the metallic substrate surface, this layer has a multiplicity of local elevations, known as rivets, distributed directly over the area of the substrate surface or distributed indirectly over the area of the substrate surface, separated from the substrate surface by means of at least one interlayer, which rivets are fixedly joined to the substrate surface or the interlayer. The local elevations, which are known as rivets, are preferably of mushroom-shape or web-like design and are joined to the substrate surface or the interlayer by means of metallurgical material-to-material bonding, which can be produced, for example, as part of a soldered or welded joint. It is also possible for the rivets to be formed as wires which run longitudinally with respect to the substrate surface and are preferably arranged to run parallel to one another on the substrate surface or on the interlayer.

A layer of material consisting of MCrAlY is deposited directly on the substrate surface or on the interlayer and on and between the rivets situated thereon in such a manner that the MCrAlY layer completely covers the substrate surface or interlayer and completely surrounds the rivets, completely fills the regions which lie between the adjacent rivets and projects above the rivets. Measured from the substrate surface or interlayer, the MCrAlY layer has a layer thickness of up to 20 mm and forms a substantially homogeneous planar surface. Since the structure height of the individual rivets is a few millimeters, i.e. 1 to 5 mm, an MCrAlY layer projects above the rivets with a freely abradable thickness of up to 15 mm.

The provision of rivets, which serve as securing structures for the MCrAlY layer deposited thereon, ensures an intimate join between the MCrAlY layer and the substrate surface which is able to withstand the critical operating conditions within a gas turbine.

To improve the quality of the join between the MCrAlY layer and the metallic substrate surface, in particular with regard to its ability to withstand high temperatures and its resistance to oxidation, it is preferable for an oxidation-resistant protective layer, for example in the form of a highly compacted MCrAlY layer, to be applied directly to the metallic substrate surface. A ceramic TBC layer can be deposited directly thereon and is able to greatly reduce the thermal load on the component or the substrate. Then, the further MCrAlY layer is deposited on the TBC layer in the manner described above.

The individual rivets, which preferably likewise consist of compacted or highly compacted MCrAlY wire, are joined to the metallic substrate surface or an interlayer situated thereon by means of a welded or soldered joint.

The MCrAlY layer which has been deposited on the substrate surface or on the interlayer and on the rivets is typically produced using a thermal flame spraying process, in which the compactness or density of the layer material which is deposited can be set individually through the choice of the deposition parameters, such as spraying rate, application temperature and the associated degree of softening of the individual heated MCrAlY particles, to mention but a few. For example, it is possible for the MCrAlY layer to be deposited with a density or porosity which is distributed homogeneously over the layer thickness; in this context, it should be ensured that the porosity allows a desired abrasion of the material which results from contact between blade or vane tip and stationary housing part when a gas turbine installation is being run in.

Alternatively, the deposition parameters used during the production of the MCrAlY layer can also be selected in such a manner that the layer regions of the MCrAlY layer which lie closest to the substrate surface or interlayer have a higher density and therefore a lower porosity than regions of the MCrAlY layer which lie close to its surface.

Finally, the temperature-stable protective coating which is formed in accordance with the invention also allows the provision of a direct supply of cooling air from the metallic substrate surface, in which suitable cooling passages are machined, opening out at this surface. The microstructure of the MCrAlY layer, which is fundamentally porous, allows the cooling air which emerges from the metallic substrate surface to propagate within the MCrAlY structure and to contribute to effective cooling of the MCrAlY layer and the joins which it forms with the metallic substrate surface, for example by means of the rivets.

To produce the protective coating according to the invention, in a first step the rivets are to be fixedly joined directly to the substrate surface or, after prior deposition of an interlayer on the substrate surface, to the interlayer. The rivets, which preferably consist of MCrAlY material, are preferably joined by welding or soldering. In a subsequent step, MCrAlY material is deposited on the substrate surface or on the interlayer and also on the rivets until the rivets are completely surrounded by MCrAlY material, regions between adjacent rivets have been completely filled by the MCrAlY material and the MCrAlY material projects above the rivets. The MCrAlY material is deposited in particular in such a manner that the surface region of the MCrAlY material layer which forms is porous and therefore abradable. Since, as has already been mentioned above, the MCrAlY material is deposited by means of thermal flame spraying, the microstructure of the MCrAlY layer which forms can be adjusted individually with regard to porosity or density. The deposition parameters are preferably set in such a manner that the material which is deposited directly on the substrate surface or interlayer and on the rivets has a high material density and that the material density decreases gradually or in steps as the distance from the substrate surface or interlayer increases, in order in this way to achieve a high porosity and a good abrasion performance.

A temperature-stable protective coating which is produced in this manner, substantially comprising an MCrAlY layer, is particularly preferably suitable as a protective coating on those stationary housing components within a gas turbine installation with which the blade or vane tips of the compressor unit or the gas turbine stage initially undergo grinding interaction. On account of the porous microstructure of the material of the MCrAlY layer, the blade or vane tips are able to wear away partial regions of the MCrAlY layer, as a function of their thermal lengthening, and in this way to produce a minimal sealing gap between the stationary and rotating components.

BRIEF DESCRIPTION OF THE INVENTION

Figure 2A:
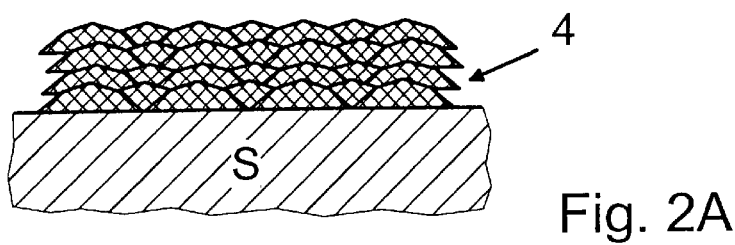
Figure 2B:
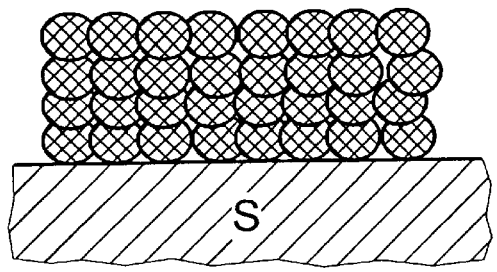
Figure 2C:
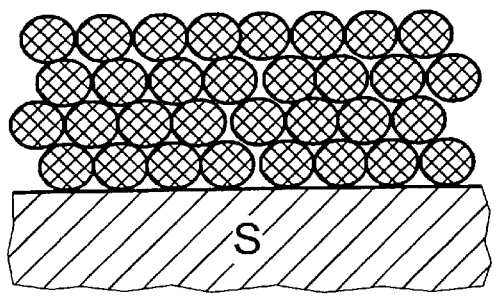
Figure 2D:
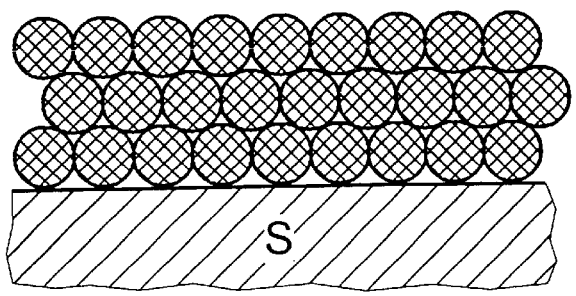
Figure 2E:
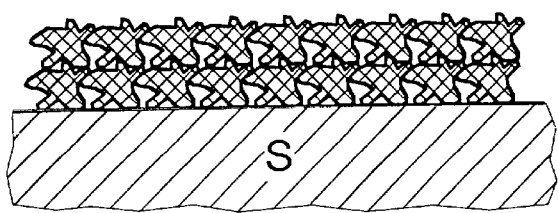
Figure 3:
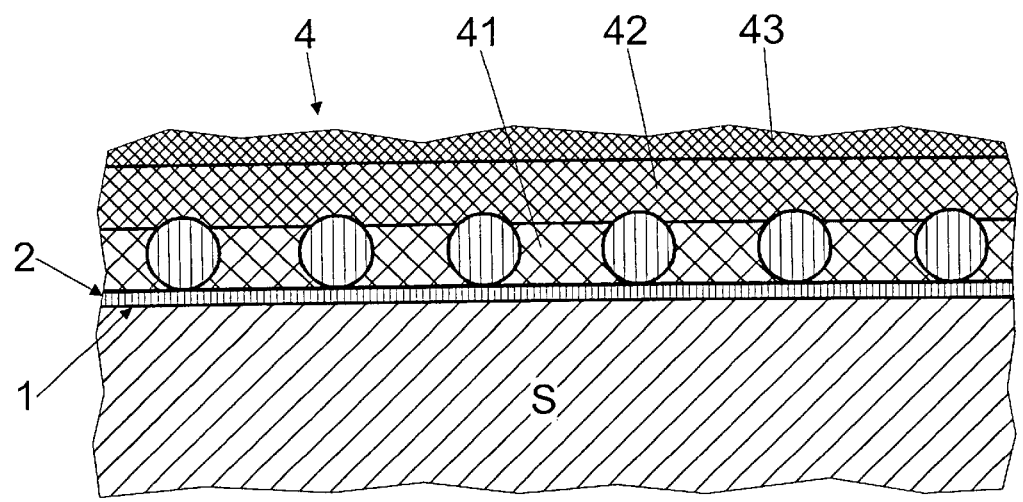
Figure 4:
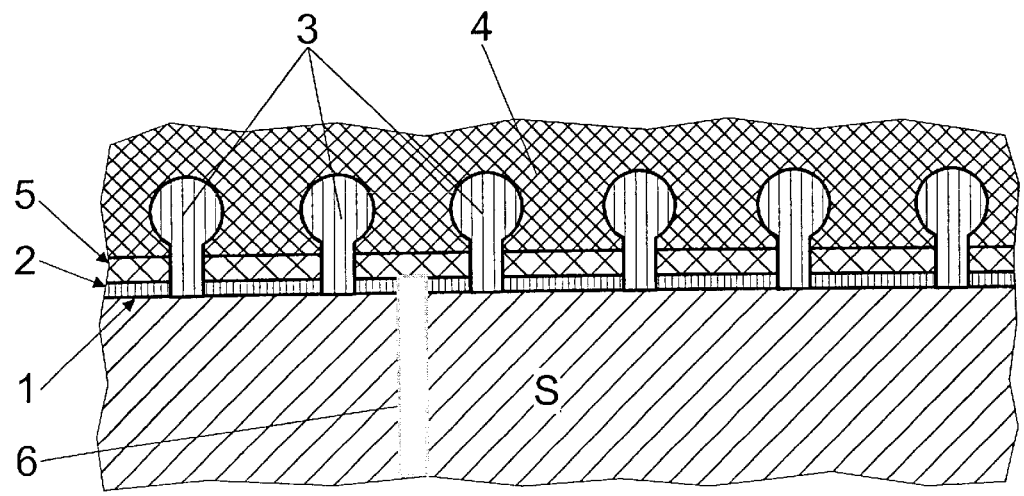

The invention is described below by way of example and without restriction to the general idea of the invention on the basis of exemplary embodiments and with reference to the drawings, in which:

FIG. 1 shows a diagrammatic cross-sectional illustration through a substrate surface on which a temperature-stable protective layer has been deposited, FIGS. 2a to e show microstructure illustrations of an MCrAlY layer with differing porosity which has been deposited using the flame spraying process, FIG. 3 shows a substrate surface with a temperature-stable protective coating with heterogeneous porosity which has been deposited above it, and FIG. 4 shows a substrate surface with a temperature-stable protective coating with interlayers.

WAYS OF CARRYING OUT THE INVENTION, INDUSTRIAL APPLICABILITY

FIG. 1 shows a cross section through a substrate S having a substrate surface 1 on which an interlayer 2 consisting of MCrAlY has been deposited. The substrate S, which consists of metal, forms, for example a heatshield which is arranged on the stationary gas turbine housing and the substrate surface 1 of which faces the interior of the housing.

The interlayer 2, which preferably consists of MCrAlY, has a high density, which is obtained by a suitable selection of the deposition parameters which define the deposition process used to produce the interlayer 2.

The rivets 3 which are illustrated in the exemplary embodiment shown in FIG. 1 are designed as wires which are arranged parallel to one another on the interlayer 2 and each have a circular wire cross section. The wire-like rivets 3 are fixedly joined to the interlayer 2 by means of welding or soldering.

The layer 4 of MCrAlY material (M stands for Ni, Fe or Co) which has been deposited on the surface of the interlayer 2 and completely surrounds the rivets is preferably produced by means of thermal flame spraying. The layer thickness of the MCrAlY layer 4 is typically up to 20 mm, and in terms of its size projects above the structure height of the rivets 3 to a considerable extent. Compared to the interlayer 2, which likewise consists of MCrAlY material, the MCrAlY layer 4 has a far lower density and therefore has a porosity which corresponds to a desired abrasion performance.

When the MCrAlY layer 4 illustrated in FIG. 1 is used inside a gas turbine, a rotor blade tip which is arranged opposite the MCrAlY layer 4 is able to locally abrade the latter by stripping interaction, with the result that a minimal sealing gap is formed between the surface of the MCrAlY layer 4 and a rotor blade tip (not shown).

The flame spraying process which is used for production of the MCrAlY layer 4 provides that an MCrAlY material which is in powder form is heated to above the softening point of MCrAlY and is directed, by means of a hot, gaseous carrier stream of high velocity, onto a substrate surface which is to be coated and which the softened or liquefied MCrAlY drops strike, wetting the surface and then solidifying to form a solid layer coating.

Different coating structures can be established in the MCrAlY layer which is formed depending on the spraying parameters which define the coating process. For example, if completely liquefied MCrAlY powder particles are used and if the drops which are formed are directed onto the substrate surface which is to be coated at a very high application velocity, the resulting MCrAlY layer 4 is very compact and dense, as shown in the cross-sectional illustration shown in FIG. 2a. If the application velocity and the degree of softening of the individual MCrAlY particles is reduced, the result is layers with an increasing porosity, as can be seen in FIGS. 2b and 2c. On the other hand, if the MCrAlY particles in powder form have previously been oxidized and are then subjected to the flame spraying process, the adhesion of the individual particles after the application process can be reduced further, and the porosity of the layer which forms can be increased, as shown in FIG. 2d. It is also possible for the layer structure to be modified by changing the form of the spray powder consisting of the MCrAlY material, as shown in the cross-sectional illustration shown in FIG. 2e.

In view of the above layer structures which can be adjusted individually, it is possible to produce MCrAlY layers with different porosities. In this respect, FIG. 3 shows a cross section through an MCrAlY layer 4 which has been produced with different deposition parameters and has three regions 41, 42 and 43 each of a different density and therefore porosity. The porosity of the layer 41 which is closest to the metallic substrate surface 1 in this case has the greatest density, the layer 43 has the lowest density, i.e. the lowest density and therefore the highest porosity. As an alternative to the stepped setting of the layer thicknesses illustrated in FIG. 3, it is also possible to form a gradual density gradient within the MCrAlY layer 4.

FIG. 4 shows a cross section through a substrate S with a metallic substrate surface 1 on which an interlayer 2 consisting of highly compacted MCrAlY material has been deposited. The rivets 3 which project through the interlayer 2 are formed as mushroom-shaped elements and are distributed uniformly over the metallic substrate surface. In one embodiment which has been implemented, the rivets have a maximum diameter of 1.4 mm and are arranged with a clear distance between them of approx. 3 mm on the metallic substrate surface 1. With a view to improving the ability to withstand heat, a ceramic temperature-stable layer 5, known as a TBC (thermal barrier coating) layer, has been deposited on the interlayer 2. The MCrAlY layer 4 has been deposited with a suitably set porosity on the TBC layer 5. The at least one cooling passage 6, which penetrates through the interlayer 2 from the substrate S and opens out into the porous region of the TBC layer 5 and of the MCrAlY layer 4 above it, is used for cooling purposes.

List of Designations

1 Metallic substrate surface
2 Interlayer
3 Rivets
4 MCrAlY layer
5 TBC layer
6 Cooling passage

What is claimed is:

1. A temperature-stable protective coating over a metallic substrate surface comprising:
    a metallic substrate having a surface;
    at least one layer of material consisting of MCrAlY, where M represents at least one of the elements selected from the group consisting of Fe, Co, and Ni;
    at least one interlayer between the at least one layer of material and the substrate surface; and
    a multiplicity of rivets distributed over the metallic substrate surface, which rivets are fixedly joined to the at least one interlayer, wherein the at least one layer of material is deposited on the at least one interlay and the rivets in such a manner that the at least one layer of material completely surrounds the rivets, completely fills regions which lie between adjacent rivets, and projects above the rivets.

2. The protective coating as claimed in claim 1, wherein the at least one layer of material has a surface which has a porously abradable consistency.

3. The protective coating as claimed in claim 2, wherein the rivets have a shape selected from the group consisting of web and mushroom, and are joined to the at least one interlayer by metallurgical material-to-material bonding.

4. The protective coating as claimed in claim 2, wherein the rivets comprise wires fixedly joined to the at least one interlayer.

5. The protective coating as claimed in claim 1, wherein the rivets have a shape selected from the group consisting of web and mushroom, and are joined to the at least one interlayer by metallurgical material-to-material bonding.

6. The protective coating as claimed in claim 1, wherein the rivets comprise wires fixedly joined to the at least one interlayer.

7. The protective coating of claim 1, wherein the rivets have a structure height in the range of 1–5 mm.

8. The protective coating as claimed in claim 1, wherein two adjacent rivets have a clear distance between them which is up to a few centimeters.

9. The protective coating as claimed in claim 1, wherein the rivets consist of MCrAlY material.

10. The protective coating as claimed in claim 1, wherein the at least one interlayer comprises an oxidation-resistant layer.

11. The protective coating as claimed in claim 10, wherein the at least one interlayer consists of high-strength MCrAlY material.

12. The protective coating as claimed in claim 1, wherein the at least one interlayer further comprises:
   a first sublayer; and
   a second sublayer;
   wherein the first sublayer comprises a MCrAlY material, and the second sublayer comprises a ceramic thermal barrier coating.

13. The protective coating as claimed in claim 1, wherein the at least one layer of material has a homogeneous, porous layer structure.

14. The protective coating as claimed in claim 1, wherein the at least one layer of material has a material-layer structure in which a layer region which is closest to the substrate surface has a higher material density than regions which lie further away from the substrate surface, and in that a region at the surface of the at least one layer of material has a material property selected from the group consisting of the lowest material density and the highest porosity.

15. The protective coating as claimed in claim 14, wherein the material density of the at least one layer of material changes gradually within the material-layer structure.

16. The protective coating as claimed in claim 14, wherein the material density of the at least one layer of material changes in steps within the material-layer structure.

17. The protective coating as claimed in claim 1, further comprising:
   open cooling passages which project through the substrate surface, through the at least one interlayer, or through both the substrate surface and the at least one interlayer, and are open toward the at least one layer of material.

* * * * *